E. R. KLEMM.
BRAKING DEVICE.
APPLICATION FILED JAN. 27, 1916.
1,217,188.
Patented Feb. 27, 1917.
3 SHEETS—SHEET 2.
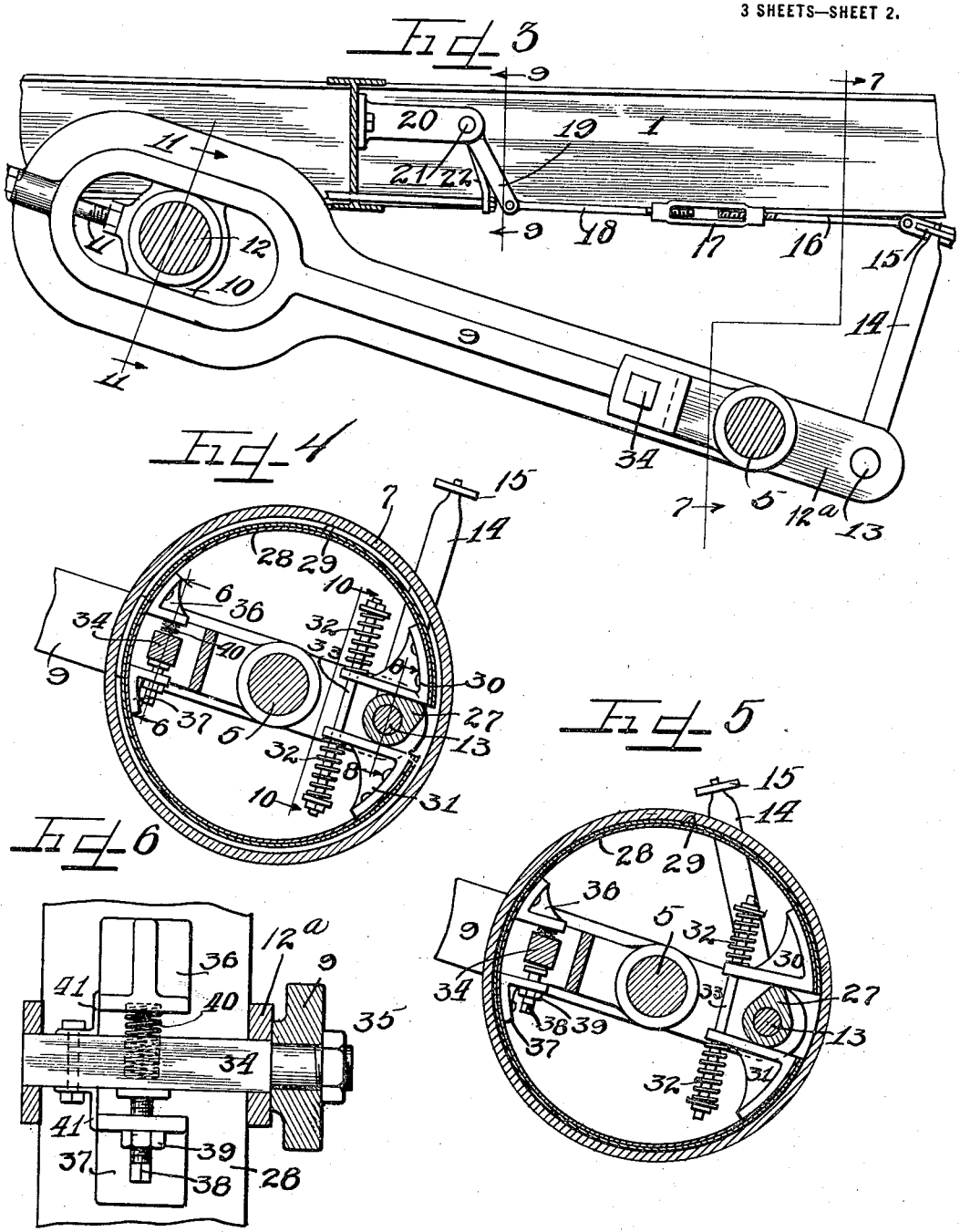

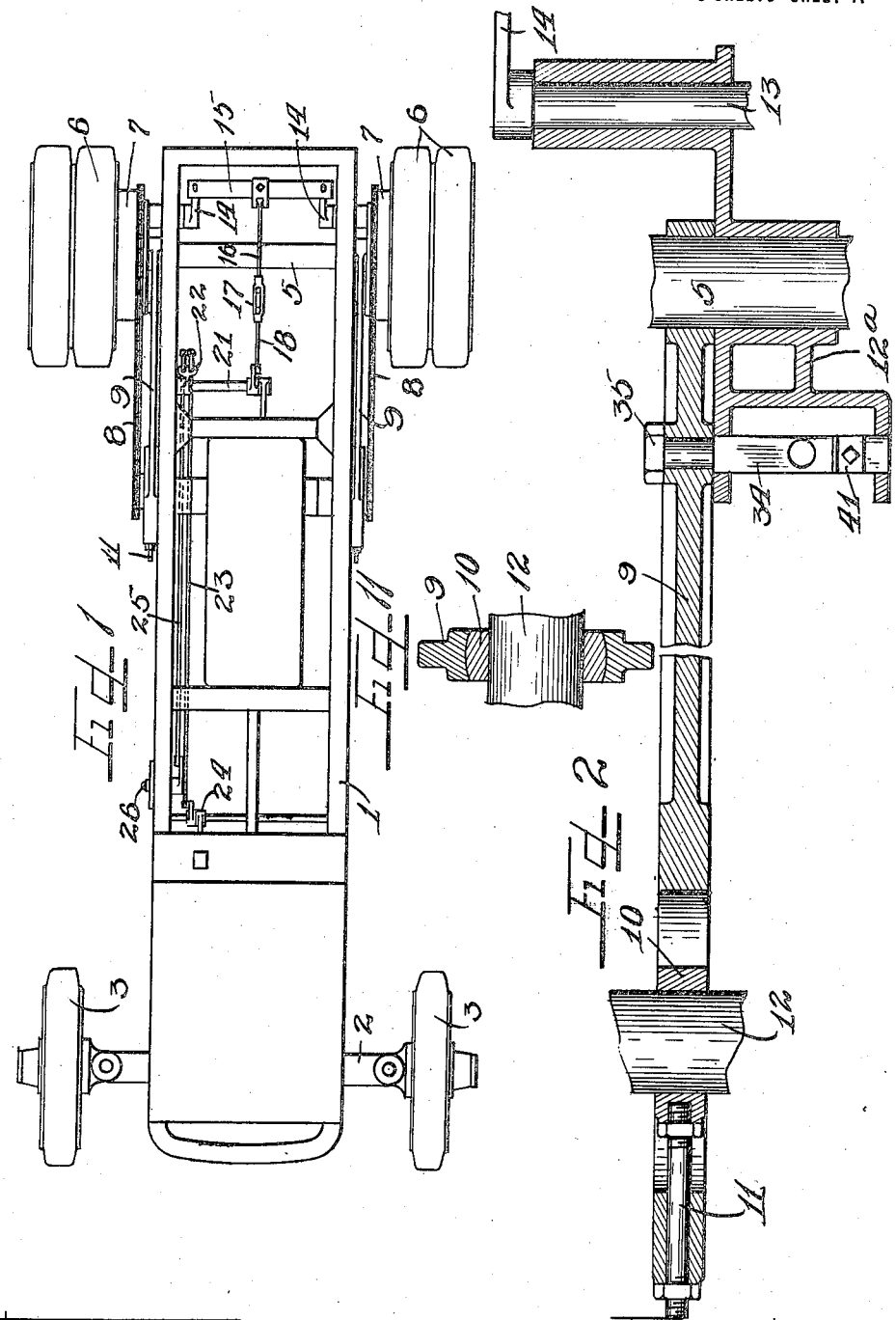

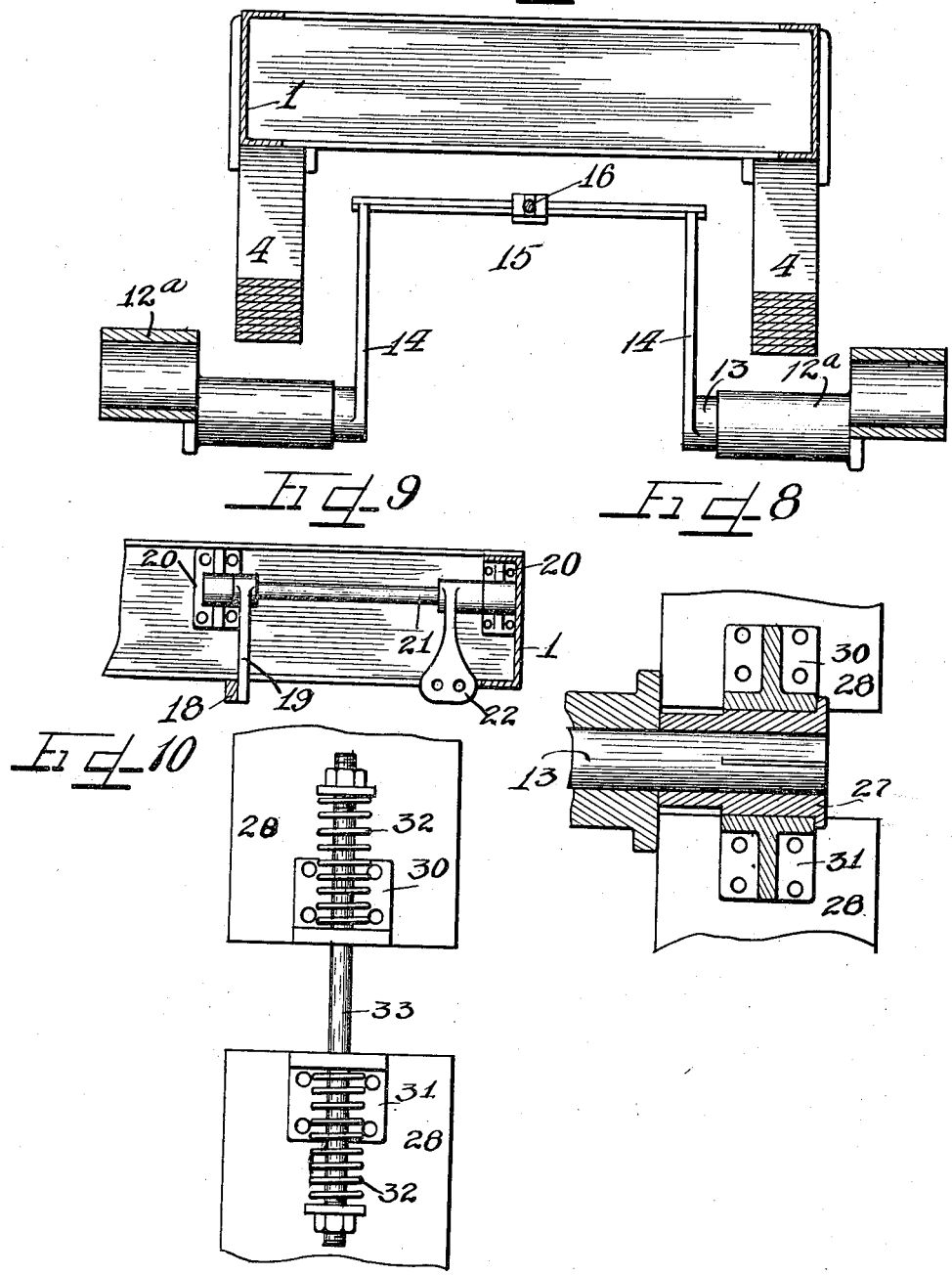

UNITED STATES PATENT OFFICE.

EMIL R. KLEMM, OF CHICAGO, ILLINOIS.

BRAKING DEVICE.

1,217,188.  Specification of Letters Patent.  Patented Feb. 27, 1917.

Application filed January 27, 1916. Serial No. 74,555.

*To all whom it may concern:*

Be it known that I, EMIL R. KLEMM, a citizen of the United States, and a resident of the city of Chicago, in the county of Cook and State of Illinois, have invented certain new and useful Improvements in Braking Devices; and I do hereby declare that the following is a full, clear, and exact description of the same, reference being had to the accompanying drawings, and to the numerals of reference marked thereon, which form a part of this specification.

This invention relates to an improved type of heavy duty brake particularly adapted for use on motor trucks and other large vehicles. The objection to most types of contracting or expanding brakes is the unequal action of the band upon the drum whereby only a part or parts of the band exert a frictional effect upon the drum, so that excessive wear upon the brake band takes place at only one or more points thereon, thus necessitating renewal of the brake band sooner than would otherwise be necessary were the entire brake band brought to bear uniformly upon the brake drum. By this invention the brake band is so associated with the brake drum as to insure positive and uniform contact of the band against the drum when the band is expanded with respect thereto, so as to exert a large braking effort and insure long life of the band, due to the uniform application thereof upon the drum.

It is an object therefore of this invention to construct a braking mechanism comprising a brake drum with an internal expanding brake band therein floating, so to speak, within the drum, so as to readily adapt itself for uniform contact and pressure on the interior of the drum when the band is expanded, excessive friction at any one point on the band acting to exert a force to shift the band to cause uniform application thereof upon the interior of the drum at all points.

It is also an object of this invention to construct an improved type of brake involving the use of a band, cam actuated and floatingly mounted upon the reach rod of the vehicle chassis to operate expansively within a drum attached to the wheel of the vehicle to brake the same.

It is also an object of this invention to construct a heavy duty brake comprising a floatingly mounted cam actuated expandible band adapted to contact with a drum with a frictional braking effect, whereby the frictional effect between said drum and band is distributed uniformly between the band and drum due to the tendency of the band to move with the drum and thereby adjust itself to a position of uniform contact within the drum.

It is furthermore an important object of this invention to construct a heavy duty brake mechanism particularly adapted for use on motor trucks and the like wherein the brake band is floatingly supported on and held from movement by the reach rod of the truck chassis, and acts expandibly by cam mechanism to contact with the interior of the brake drum secured on the wheel of the truck with great friction.

It is finally an object of this invention to construct an improved type of brake mechanism wherein the result of frictional contact between a brake band and its drum or rim causes movement of the parts of the brake band to insure uniform contact thereof throughout its length with the drum or rim to secure a maximum braking effect and without possibility of abnormal wear at any particular point on the band.

The invention (in a preferred form) is illustrated in the drawings and hereinafter more fully described.

In the drawings:

Figure 1 is a conventional top plan view with parts omitted of a truck chassis to which a brake mechanism embodying the principles of my invention is connected.

Fig. 2 is a fragmentary detail view partly in section and partly in elevation, illustrating the method of mounting a portion of the brake mechanism on the reach rod of the truck chassis.

Fig. 3 is a side elevation with parts in section shown fragmentarily, of the mechanisms illustrated in Fig. 2.

Fig. 4 is a sectional interior view of a brake drum showing a mechanism therein in release or non-braking position.

Fig. 5 is a section illustrating the same expanded or in braking position.

Fig. 6 is a fragmentary detail section taken on line 6—6 of Fig. 4.

Fig. 7 is a fragmentary detail section with parts omitted taken on line 7—7 of Fig. 3.

Fig. 8 is a detail section taken on line 8—8 of Fig. 4.

Fig. 9 is a detail section taken on line 9—9 of Fig. 3.

Fig. 10 is a detail section taken on line 10—10 of Fig. 4.

Fig. 11 is a detail section taken on the line 11—11 of Fig. 3.

As shown in the drawings:

Referring first to Fig. 1, the chassis frame is denoted as a whole by the reference numeral 1, supported at the front end upon an axle 2, upon which are journaled steering wheels 3, and at its rear end, supported upon springs 4, which are in turn connected on a rear axle 5. Journaled and secured upon the outer end of the rear axle 5, are rear driving wheels 6, and secured to each of the rear driving wheels are brake drums 7. As shown in Fig. 1, a chain drive 8, of any preferred type, is provided for the rear wheels 6. In order to positively maintain the rear axle 5, adjustably and yet in a predetermined relation to the chassis frame, reach rods, denoted as a whole by the reference numeral 9, are provided, a detail of one thereof being shown in Figs. 2 and 3. At its forward end, each of said reach rods is enlarged and provided with a long opening affording a guide-way in which is mounted a crosshead 10, slidable in said guideway slot and adjustable by means of a take-up bolt 11, and journaled through said crosshead is a pivot shaft 12, secured in any suitable manner to the chassis frame 1. The other or rear end of each of the reach rods 9, is journaled upon the axle 5. Z-bar frames 12$^a$, are also journaled upon the axle 5, and connected by means hereinafter described rigidly to the reach rods, each affording a journal support for an actuating cam shaft 13. Secured upon the inner end of each of the cam shafts 13, are cranks or levers 14, and said levers 14, are connected by an equalizing bar 15, so that both of said levers and said cam shafts may be operated simultaneously.

Pivotally connected to said equalizing bar 15, is a pull rod 16, equipped with a turn buckle 17, to which another pull rod 18, is connected. The pull rod 18, is pivotally connected into the end of a crank 19, which is fixed on a shaft 21, journaled in brackets 20. Also connected upon said shaft 21, is a lever or crank 22, provided with two apertures or slots therethrough, one receiving slidably engaged therethrough a pull rod 23, connected to a crank extension of an actuating pivotally mounted foot pedal 24; and the other receiving, also slidably engaged therethrough, another pull rod 25, connected for actuation to a crank extension of a pivotally mounted emergency brake lever 26. It is clear from the manner of connection of the respective pull rods 23 and 25, to the crank 22, by which the brakes are actuated, that either one thereof may be actuated independently of the other, as the case may be, to apply the brakes. The actuating movement is transmitted to the mechanisms within the brake drums 7, due to the rotation of the cam shaft 13, on which a cam 27, is secured.

The brake band consists of a band of metal 28, covered with a brake lining material 29, and brazed, riveted, or otherwise suitably secured to the ends of the band 28, are shoes 30 and 31, respectively, disposed on opposite sides of the cam 27, and contacting with the same. Said shoes 30 and 31, are normally impelled toward one another to contract the brake band by coiled compression springs 32, mounted on the ends of a rod 33, which is loosely slidable through apertures in the inner ends of said shoes 30 and 31.

Mounted in the forward extension of the Z-frame 12$^a$, is a rectangular bar or bolt 34, the head of which is cylindrical and extends through an aperture provided in a boss on the reach rod 9, and with a retaining nut 35, on the inner end of said bolt, whereby the Z-bar frame 12$^a$, is held rigidly associated with the reach rod 9. Riveted near the middle of the brake band and opposite to the shoes 30 and 31, are small shoes 36 and 37, respectively, positioned so as to be disposed one on each side of the rectangular bolt 34, as clearly shown in Figs. 4, 5, and 6. Threaded through the shoe 37, is an adjusting bolt 38, provided with a lock nut 39, the end of said bolt having a flattened bearing surface to contact beneath the rectangular bolt 34. Seated in a recess on the other side of said rectangular bolt 34, is one end of a coiled compression spring 40, the other end of said spring seating in a recess provided in the shoe 36. Small angle members 41, are bolted on each side of the rectangular bolt 34, as clearly shown in Fig. 6, so disposed as to form guides for the side edges of said respective shoes 36 and 37.

The operation is as follows:

The brake band 28—29, may be expanded within the brake drum 7, of the wheel from the position shown in Fig. 4, to that shown in Fig. 5, by actuating either the foot pedal 24, or hand brake lever 26, which will, through the respective pull rods provided for the purpose, rotate the respective cam shafts 13, whereby the respective cams 27, of the brakes on each wheel are rotated, to thereby shift the shoes 30 and 31, attached to the brake band away from one another against compression of their springs 32.

The result of the expansion of the brake band 28—29, against the inner periphery of the brake drum 7, will cause the brake band to tend to rotate with the brake drum, and as a result the spring 40, will be compressed as the shoe 36, moves therewith, the adjustable stop bolt 38, moving away from beneath the rectangular bolt 34, as clearly shown in Fig. 5. It is apparent, therefore, from the manner in which the brake band shifts its position within the brake drum when the band is expanded for application to the drum, that it practically floats within the drum, so as to adapt itself to a uniform contact on the interior of the drum when applied thereto, the frictional effect at any one point on the band serving to cause a shifting movement of the entire band, so that the whole brake band is brought into action. The members which resist the braking stress or tendency of the brake band to rotate, are the rectangular bolt 34, and the cam shaft 13, the former acting, through the Z-bar frame 12ª, directly upon the reach rod 9, the cam shaft 13, however, being held entirely by the Z-bar frame. Of course upon release of the brake, the springs 32, act to contract the band to withdraw the same out of frictional contact with the brake drum, assisted by the action of the spring 40. The spring 42, serves to return the lever or link mechanism of the brake gear to normal position when the same is released, co-acting for the purpose with the springs within the brake drum of the brake itself.

I am aware that various details of construction may be varied through a wide range without departing from the principles of this invention, and I therefore do not purpose limiting the patent granted otherwise than necessitated by the prior art.

I claim as my invention:

1. In a device of the class described, the combination with an axle and reach rod, of a frame journaled on the axle and rigidly secured to the reach rod, a cam journaled on said frame, an expansible brake band slightly rotatable about said frame, resilient means resisting movement of said brake band with respect to said frame, and springs acting to resist expanding movements of the band by said cam.

2. In a device of the class described, the combination with an axle and a reach rod, of a frame journaled on the axle, a bolt affording rigid connection between said frame and reach rod, an expansible brake band disposed about said frame and unconnected therewith, co-acting retaining means affording connection between said band and said bolt to permit movement of said band, means for expanding said band and serving to assist in supporting the same in proper position, and means resisting expansion of said band.

3. The combination of an axle and reach rod journaled thereon, of a frame journaled on said axle, means rigidly connecting the frame to the reach rod, an expansible brake band disposed about said frame and unconnected therewith, shoes on said brake band co-acting with the means of connection between said frame and reach rod to position the band and permit slight movement thereof, and mechanism acting on the ends of the band to expand the band.

In testimony whereof I have hereunto subscribed my name in the presenct of two subscribing witnesses.

EMIL R. KLEMM.

Witnesses:
CHARLES W. HILLS, Jr.,
EARL M. HARDINE.